Nov. 6, 1923.

W. M. LAUER

TROLLEY LOCK

Filed May 15, 1923

1,473,567

WITNESSES

INVENTOR
WILLIAM M. LAUER
BY
ATTORNEYS

Patented Nov. 6, 1923.

1,473,567

UNITED STATES PATENT OFFICE.

WILLIAM M. LAUER, OF GLENS FALLS, NEW YORK.

TROLLEY LOCK.

Application filed May 15, 1923. Serial No. 639,167.

*To all whom it may concern:*

Be it known that I, WILLIAM M. LAUER, a citizen of the United States, and a resident of Glens Falls, in the county of Warren and State of New York, have invented a new and Improved Trolley Lock, of which the following is a full, clear, and exact description.

This invention relates to a trolley lock, and has for an object the provision of means whereby the trolley wire may be retained in proper relation to the trolley wheel at all times except when the conductor of the trolley car otherwise desires.

Another object concerns the provision of means whereby a proper relation between the wire and the wheel is maintained at all times regardless of the position of the trolley pole so that the device for locking or latching the wire to the wheel will not cause the wire to be unduly clamped or pinched.

A further object concerns the provision of means whereby the locking or latching action can be instantly released by the conductor merely upon pulling a rope, which is at the same time used for lowering the trolley pole.

The invention is illustrated in the drawings, of which—

Figure 1:
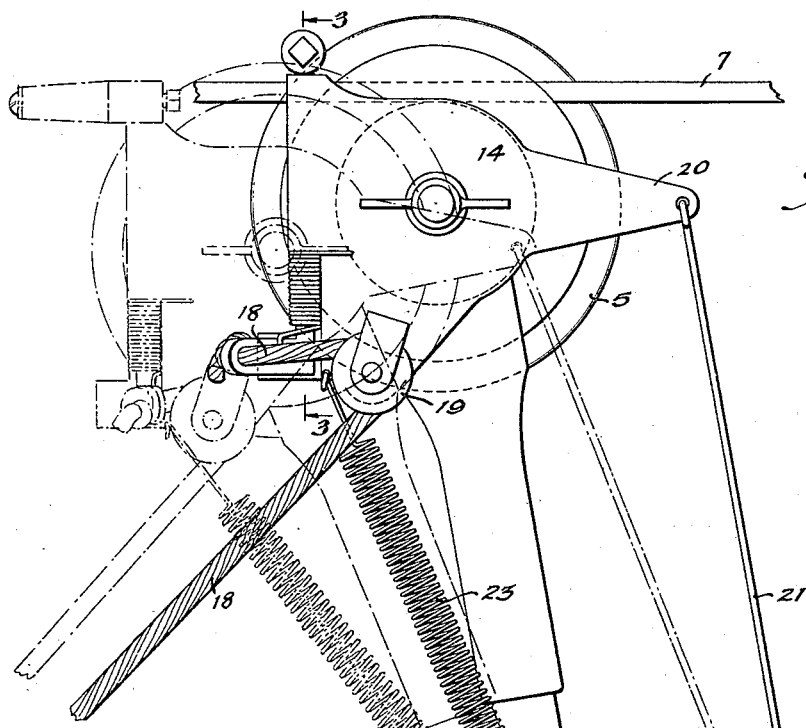
Figure 1 is a side elevation of the device mounted on the roof of a trolley car, showing in dotted line an alternate position of the parts.
Figure 2:
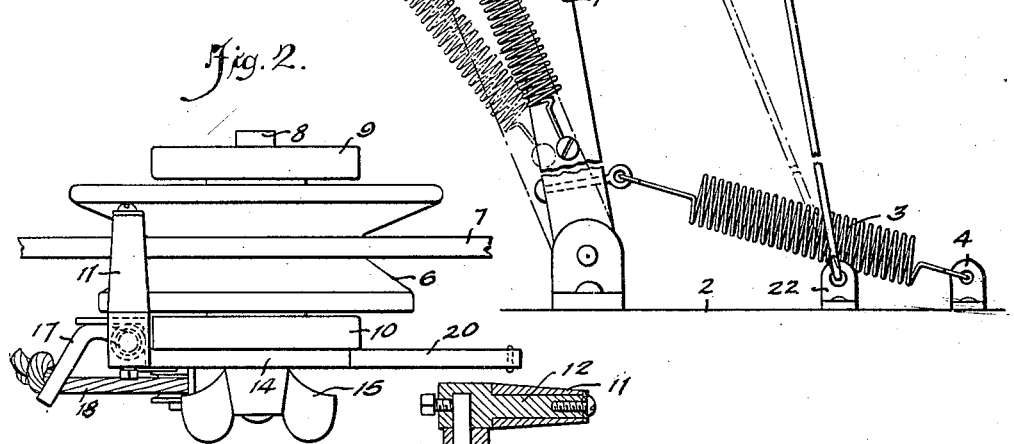
Fig. 2 is a plan view of the device.
Figure 3:
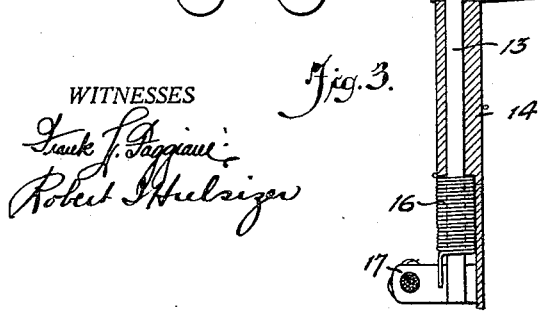
Fig. 3 is a sectional detail of the latching or locking mechanism, taken on the line 3—3 of Fig. 1.

The form of the invention shown in the drawings is a preferred form, although it is understood that modifications in the construction and arrangement of the parts and in the character of the materials used may be adopted without departing from the spirit of the invention.

The preferred form of the invention shown in the drawings includes the usual trolley pole 1 attached to the roof 2 of a trolley car and adapted to be held in the normal position, shown in full lines, by the action of a spring 3 fastened at one end to the trolley pole and at the other end to a fixed point on the roof of the car, such as a bracket 4. At the end of the trolley pole is mounted the usual trolley wheel 5 having a groove 6 therein in which the trolley wire 7 is adapted to ride. This trolley wire, as has been proven many times by experience, is very liable to get out of the groove and to thereby permit the trolley pole and wheel to be pulled vertically, so that as the car progresses with the pole in this position the stay and guy wires supporting the trolley wire are drawn and broken and considerable danger is liable to ensue from the dropping of a live wire on the ground. The trolley wheel 5 is mounted on a stub shaft such as 8 extending through the wheel and mounted between side plates 9 and 10 formed on the end of the trolley pole, these side plates forming a yoke between which the wheel rotates.

In order that the trolley wire may more effectively be held in proper relation to the groove 6 in the wheel 5, I provide a latch or lock member such as 11 in the form of a roller adapted to project over the groove. This roller is mounted on a stub shaft 12 which in turn is mounted or keyed to the end of a vertical rib or shaft 13. This vertical shaft 13 bears in a pivot plate or frame 14 and is preferably introduced along a vertical edge thereof. This plate or frame 14 is preferably loosely mounted on the stub shaft 8 on which the wheel 5 is mounted and is held in position on said shaft by means of a wing nut 15. The lower end of the shaft 13 is engaged by a spring 16 which tends normally to hold it in such position that the lock 11 projects over the groove 6. The lower end of the shaft 13 is provided with an extending finger 17 to which one end of a rope 18 may be attached. This rope is adapted to pass over the pulley 19 and thence downward to within the reach of the hands of the conductor. By pulling the rope 18 the finger or extension 17 is rotated through a sufficient angle to rotate the lock or projecting roller to the dotted position shown in Fig. 1 and remove it from projecting over the groove so that the wheel can be disengaged from the trolley wire. In other words, when the trolley wire is ordinarily latched to the wheel in the manner above described it is only necessary to pull on the rope 18 to first remove the latch or projecting member and then a continued movement will result in the lowering of the pole 1, as indicated by the dot-and-dash position shown in Fig. 1. However, in lowering the trolley pole it must be observed that if the latch member 11 did not maintain a definite position with respect to the trolley wire, the rotation of the pole and the wheel and the continued disposition of the latch member across the groove would cause the wire to be bent or clamped unduly. To prevent this action, I provide an extension or wing portion on the frame 14, this wing portion being designated by the numeral 20; and this wing portion is connected by a rigid link 21 to a fixed point on the roof of the car, such as a bracket 22. To another part of the frame 14 I attach a spring 23 which, at the other end, is attached to the trolley pole. It will, therefore, be observed that whenever the trolley pole is lowered or tends to jump away from the wire, this action not being caused by a pull on the rope 18, the frame 14 will, nevertheless, retain a fixed angular position with respect to the wire so that a substantially horizontal path will be provided for the wire through the groove 6 and beneath the latch member 11. The length of the link 21 with regard to the length of the trolley pole and the path of rotation thereof is designed to maintain the frame 14 in this one position regardless of the angular position of the trolley pole. The spring 23, of course, tends to keep the plate in the proper position and opposing the action of the link 21, whereby a balance is maintained.

It will, therefore, be observed that I have provided a simple plate or frame which can be attached to the side of any trolley wheel, which frame is provided with a latch member adapted to project over the groove of the pole to latch the wire therein, and so constructed that a mere pull on the rope will not only lower the pole but release the latch. Furthermore, this frame is so connected by linkage with a fixed point on the car that rotation of the pole will, nevertheless, cause the maintenance of the latch member in the proper position at all times to eliminate the possibility of the latch member clamping or gripping the wire unduly.

What I claim is:—

1. In combination with a trolley wheel mounted on a trolley pole, said wheel adapted to receive a trolley wire in its groove, of a frame member loosely mounted on the pole adjacent the wheel, a shaft on said frame member, a lock member connected to said shaft and extending normally across the groove to hold the trolley wire in the groove, a spring connected to said pole at one end and to the frame at the other, and a link connecting another portion of said frame to a fixed point such as the roof of a trolley car, said link and spring being designed to maintain the frame in the same relative position with respect to the wheel regardless of the position of the trolley pole.

2. In combination with a trolley wheel and pole, said wheel having a groove adapted to receive a trolley wire therein, of a frame loosely mounted on the pole adjacent the wheel, a lock member extending across the groove to hold the wire therein, a shaft on said frame on which said lock member is mounted, said shaft having a normally vertical position on said frame, a spring engaging said shaft and tending to hold the lock member in its normal position across the groove, a laterally extending arm on the lower end of said shaft, a rope or cable connected at one end to said arm, and a pulley on said frame through which said rope passes, the initial movement of said rope when pulled by the conductor first moving the lock member away from the slot whereby the wire can be disengaged from the wheel, further movement of said cable causing the removal of the wheel from the wire.

3. In combination with a trolley wheel and pole, said wheel having a groove adapted to receive a trolley wire therein, of a frame loosely mounted on the pole adjacent the wheel, a lock member extending across the groove to hold the wire therein, a shaft on said frame on which said lock member is mounted, said shaft having a normally vertical position on said frame, a spring engaging said shaft and tending to hold the lock member in its normal position across the groove, a laterally extending arm on the lower end of said shaft, a rope or cable connected at one end to said arm, and a pulley on said frame through which said rope passes, the initial movement of said rope when pulley by the conductor first moving the lock member away from the groove whereby the wire can be disengaged from the wheel, further movement of said cable causing the removal of the wheel from the wire, a spring connected between said frame and the trolley pole, and a rigid link connecting said frame to the roof of the trolley car, the spring and link designed to maintain the vertical disposition of the lock member shaft and the frame regardless of the position of the trolley pole.

WILLIAM M. LAUER.